Nov. 22, 1966   W. C. BOYCE ETAL   3,286,317
LOW-PROFILE, HIGH-STRENGTH LATCH
Filed Feb. 27, 1964
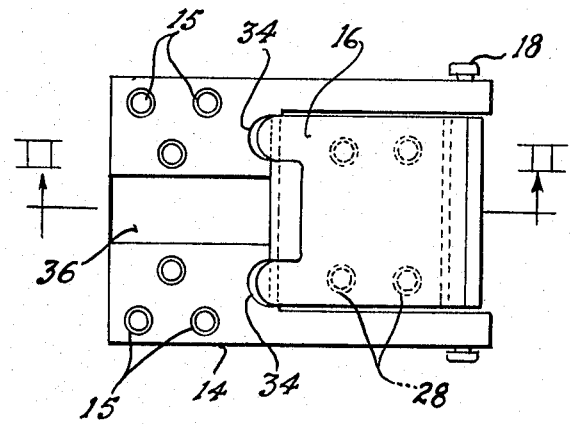
FIG. 1
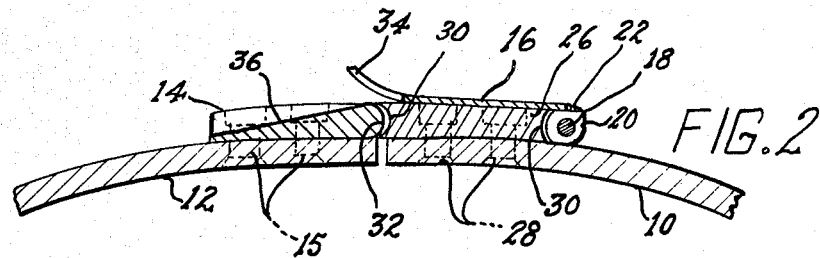
FIG. 2
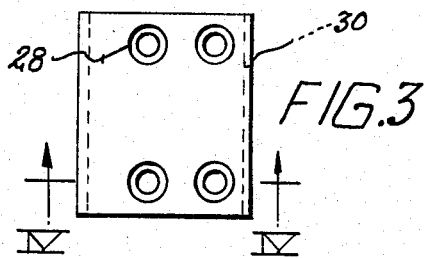
FIG. 3
FIG. 4
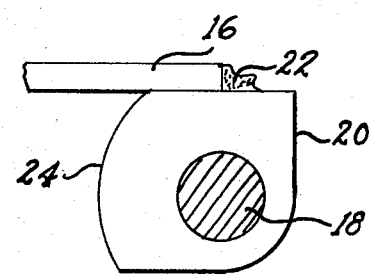
FIG. 5
INVENTORS.
WILLIAM C. BOYCE
HOWARD E. FREEMAN
BY
ATTORNEYS

United States Patent Office 3,286,317
Patented Nov. 22, 1966

3,286,317
LOW-PROFILE, HIGH-STRENGTH LATCH
William C. Boyce, Dallas, and Howard E. Freeman, Grand Prairie, Tex., assignors, by mesne assignments, to the United States of America as represented by the Secretary of the Air Force
Filed Feb. 27, 1964, Ser. No. 347,975
3 Claims. (Cl. 24—223)

This invention relates to devices for use in securing two rigid, or semirigid parts, for example, such as the protective suits used in restraint systems by astronauts or occupants of high performance aircraft. More particularly, it comprises a high strength, low profile, latch which can be quickly and easily closed or opened and which is capable of securely fastening a breastplate to a back plate of a restraint system such as that described in application Serial No. 347,980, filed on even date herewith.

There are many conventional buckle, strap or cable fasteners which are employed for securing purposes; however, they are sometimes clumsy, insecure, hard to adjust or difficult to fasten or unfasten.

Briefly, this invention comprises three elements, the first of which is movably attached to a second element. In use, a third element is inserted into an opening in the second element and the first element is closed over it to form a lock.

It is an object of this invention to overcome the above deficiencies in conventional latches by providing a strong, secure device with a low profile which will be easy to fasten and unfasten.

It is further object to provide such a device which can be economically produced from easily obtainable, conventional materials that lend themselves to mass production manufacturing techniques.

These and other advantages will be apparent upon consideration of the following detailed description, especially when taken in conjunction with the accompanying drawings, in which:

FIGURE 1 is a plan view of the latch of this invention with the elements in locked position;

FIGURE 2 is a view in section taken along lines II—II of FIGURE 1 and includes portions of the elements to be secured together;

FIGURE 3 is a plan view of the back plate fitting of the latch of this invention;

FIGURE 4 is a sectional view of FIGURE 3 taken along lines IV—IV; and

FIGURE 5 is a detail of the cam of the lock plate.

The device of this invention is capable of maintaining two portions that are required to be secured together in a fixed relationship. As can be seen in FIGURE 2, a back plate 10 is to be attached to a breastplate 12 of a protective suit of the type described in the aforementioned application relating to a hard shell restraint system. The breastplate 12 has riveted thereto by means of rivets 15 a generally U-shaped or bifurcated member 14 which serves as a breastplate fitting. The extremity of the legs formed by the bifurcated member 14 has hinged thereto a lock plate 16. The securing of the two elements is achieved by means of a pin 18 which is peened over or swaged at its ends to prevent accidental removal.

The lock plate 16 has formed as a part thereof a cam 20, the cam surface 24 of which is eccentric with respect to its pivot axis or the hole accommodating the pin 18. In practice, the lock plate 16 might be made by welding it, for example, at 22 to the eccentric cam 20 (FIGURE 5). The eccentric surface of the cam 20 is designated with the numeral 24 and bears against a back plate fitting 26 which is secured to the back plate 10 by means of rivets 28. The back plate fitting 26 has concave, generally cylindrical grooves 30 which form segments of a cylinder at each end thereof. One segment mates with the cam surface 24 while the other mates with a convex surface indicated at 32 on the breastplate fitting.

To operate the latch the breastplate 12 and the back plate are drawn together with the breastplate fitting 14 having its lock plate 16 rotated out of its locking, camming position. The bifurcated breastplate fitting 14 and the cam 20 of the lock plate 16 surround the back plate fitting 26. Rotation of the lock plate 16 rotates the cam 20 so that the cam surface 24 causes the cylindrical contours to engage one another, thereby firmly fastening the breastplate 12 to the back plate or back torso shell 10. The locking plate 16 has provided at one end a pair of tabs 34 which are bent upwardly to facilitate lifting of the lock plate to engage the latch.

In use with the aforementioned hard shell restraint system a harness cable which passes over the lock plate for the shoulder harness protects the latch against inertial loads. A groove is provided at 36 to accommodate the shoulder harness cable. Where a cable is not to be utilized the lock plate could be secured by a conventional spring or snap type retainer.

Thus, there has been described a low profile, high strength latch which, because of the cylindrical contour engagement, is capable of carrying shear loads in all directions as well as torsional and bending moments.

Although the invention has been described with reference to a particular embodiment, it will be understood to those skilled in the art that the invention is capable of a variety of alternative embodiments within the spirit and scope of the appended claims.

We claim:
1. A low profile high strength latch for joining two objects comprising
   a bifurcated member secured to one of said objects, said member having a convex surface within the bifurcated portion of said member, opposite its open end,
   a cam member rotatably mounted proximate the ends of and between the legs of said bifurcated member, and
   a fitting on the other of said objects, said fitting comprising a flat plate of a size to fit within the bifurcated portion of said bifurcated member, with opposite edges of said fitting having concave grooves therein for engagement with said convex surface of said bifurcated member and said cam.
2. A latch as defined in claim 1 wherein said concave and convex surfaces are segments of a cylinder.
3. A latch as defined in claim 1 including a lock plate secured to said cam member for operation thereof.

References Cited by the Examiner

UNITED STATES PATENTS

| 649,831 | 5/1900 | Fuller | 287—103 |
| 1,091,344 | 3/1914 | Jenks | 24—68 |
| 1,220,777 | 3/1917 | Neider | 24—211 |
| 1,233,215 | 7/1917 | Gates | 24—223 |

FOREIGN PATENTS

| 663,925 | 4/1929 | France. |
| 789,992 | 1/1958 | Great Britain. |

WILLIAM FELDMAN, Primary Examiner.

E. SIMONSEN, Assistant Examiner.